(12) United States Patent
Gupta et al.

(10) Patent No.: US 9,504,971 B2
(45) Date of Patent: Nov. 29, 2016

(54) MIXING APPARATUS AND METHOD OF PREPARING EDIBLE DISPERSIONS

(75) Inventors: Shailendra Gupta, AT Vlaardingen (NL); Johannes Jozef M Janssen, AT Vlaardingen (NL); Krysztof Piela, AT Vlaardingen (NL)

(73) Assignee: Unilever BCS US, Inc., Englewood Cliffs, NJ (US)

( * ) Notice: Subject to any disclaimer, the term of this patent is extended or adjusted under 35 U.S.C. 154(b) by 228 days.

(21) Appl. No.: 14/344,183

(22) PCT Filed: Aug. 17, 2012

(86) PCT No.: PCT/EP2012/066119
§ 371 (c)(1),
(2), (4) Date: Mar. 11, 2014

(87) PCT Pub. No.: WO2013/037605
PCT Pub. Date: Mar. 21, 2013

(65) Prior Publication Data
US 2014/0356512 A1    Dec. 4, 2014

(30) Foreign Application Priority Data
Sep. 16, 2011    (EP) .................................... 11181631

(51) Int. Cl.
*B01F 7/00*    (2006.01)
*B01F 3/12*    (2006.01)
(Continued)

(52) U.S. Cl.
CPC ......... *B01F 7/00008* (2013.01); *A23D 7/0056* (2013.01); *A23D 7/02* (2013.01); *A23D 7/05* (2013.01); *A23D 9/02* (2013.01);
(Continued)

(58) Field of Classification Search
CPC .................... B01F 2215/0016; B01F 3/1214; B01F 7/00008; B01F 7/00816; B01F 7/00825; B01F 7/00833
See application file for complete search history.

(56) References Cited

U.S. PATENT DOCUMENTS 3,174,185 A * 3/1965 Gerber ................. B29C 47/527
366/99
3,514,079 A * 5/1970 Little, Jr. ............ B01F 7/00816
241/261.1
(Continued)

FOREIGN PATENT DOCUMENTS

EP    1651338 B1    5/2006
EP    1331988 B1    6/2006
(Continued)

OTHER PUBLICATIONS

Elvers et al, Margarines and shortenings, Ullmanns Encyclopedia of Industrial Chemistry, 1990, 156-158, 5th Edition, vol. A16.
(Continued)

*Primary Examiner* — Tony G Soohoo
(74) *Attorney, Agent, or Firm* — Gerard J. McGowan, Jr.

(57) ABSTRACT

Disclosed is a mixing apparatus which is characterized by a specific range of cavity diameters in combination with a specific range for the size of the inner element (i.e. the maximum diameter, typically of the rotor). Said mixing apparatus provides good shear and distributive mixing with low energy dissipation (i.e. low temperature increase of the mixture due to the mixing process) and allows the manufacture of edible dispersions at a wide range of mixture throughput levels. Also disclosed is a process using said mixing apparatus for the manufacture of edible dispersions.

15 Claims, 4 Drawing Sheets

(51) Int. Cl.
  *A23D 7/02* (2006.01)
  *A23D 9/05* (2006.01)
  *A23D 7/005* (2006.01)
  *A23D 7/05* (2006.01)
  *A23D 9/02* (2006.01)

(52) U.S. Cl.
  CPC .............. *A23D 9/05* (2013.01); *B01F 3/1214* (2013.01); *B01F 7/00816* (2013.01); *B01F 7/00825* (2013.01); *B01F 7/00833* (2013.01); *B01F 2215/0016* (2013.01)

(56) References Cited

U.S. PATENT DOCUMENTS

| | | | |
|---|---|---|---|
| 4,419,014 A * | 12/1983 | Gale | B01F 7/00816 366/279 |
| 4,687,794 A | 8/1987 | Huddleston et al. | |
| 4,695,165 A | 9/1987 | Fukumizu et al. | |
| 4,913,556 A | 4/1990 | Schroter et al. | |
| 5,548,033 A | 8/1996 | Vetter et al. | |
| 5,957,122 A * | 9/1999 | Griggs | B01F 7/00816 122/26 |
| 6,345,907 B1 * | 2/2002 | Akay | B01F 7/00816 366/305 |
| 2005/0047270 A1 * | 3/2005 | Wood | A01K 63/042 366/170.3 |
| 2005/0150618 A1 * | 7/2005 | Kazem | B01F 7/00816 162/50 |
| 2005/0259510 A1 * | 11/2005 | Thoma | B01F 3/04531 366/168.1 |
| 2009/0143253 A1 * | 6/2009 | Smith | B01F 3/0446 507/102 |
| 2009/0184056 A1 * | 7/2009 | Smith | B01F 7/00816 210/712 |
| 2010/0252492 A1 * | 10/2010 | Wood | A01K 63/042 210/205 |
| 2011/0075507 A1 * | 3/2011 | Wootan | B01F 3/0807 366/124 |
| 2014/0334250 A1 * | 11/2014 | Brown | B01F 7/00816 366/297 |

FOREIGN PATENT DOCUMENTS

| | | |
|---|---|---|
| GB | 894627 A | 4/1962 |
| JP | 6349239 | 8/1986 |
| JP | 63049239 | 8/1986 |
| JP | 05015756 | 7/1991 |
| JP | 5015756 | 3/1993 |
| JP | 5015757 | 4/1993 |
| JP | 11090212 | 9/1997 |
| JP | 2006008852 | 6/2004 |
| JP | 2006008852 A | 1/2006 |
| SU | 1729767 | 4/1992 |
| WO | WO0170486 | 9/2001 |
| WO | WO0238263 A1 | 5/2002 |
| WO | WO03000393 A1 | 1/2003 |
| WO | WO03064129 | 8/2003 |
| WO | WO2005014158 A1 | 2/2005 |
| WO | WO2007000610 | 1/2007 |
| WO | WO2007087552 | 8/2007 |
| WO | WO2007105323 | 9/2007 |
| WO | WO2010069751 A1 | 6/2010 |

OTHER PUBLICATIONS

Munuklu, Experimental and Analytical Facilities, Delft University of Technology 2005 4 pp. 41-51.

Munuklu et al., Particle formation of edible fats using the supercritical melt micronization process (ScMM), Journal of Supercritical Fluids, 2007, 181-190, 43.

Piela et al., Power Consumption of a Rotor-Stator Mixer with Cavities, 14th European Conference on Mixing: Sep. 10, 2012, 377-382.

International Search Report and Written Opinion for International Appln. No. PCT/EP2012/066119 mailed Nov. 26, 2012, 5 pages.

IPRP in PCTEP2012066119, Mar. 18, 2014, PCT Preliminary Opinon 5 pages.

Written Opinion in EP12748466, Mar. 31, 2015, EP.

Translation of JP2006008852 A 20060112, translated by Thompson Scientific, 16 pgs, Jan. 2011.

* cited by examiner

MIXING APPARATUS AND METHOD OF PREPARING EDIBLE DISPERSIONS

FIELD OF THE INVENTION

The present invention relates to a mixing apparatus and the use of a mixing apparatus to prepare edible dispersions.

BACKGROUND OF THE INVENTION

Edible dispersions are well known in the art and include for example products such as spreads like margarine which are water-in-oil (W/O) emulsions, wherein an aqueous phase is dispersed in a fat continuous phase.

Generally food products like for example margarines and similar edible fat continuous spreads are prepared according to known processes that encompass the following steps:
1. Mixing of the liquid oil, the structuring fat and if present the aqueous phase at a temperature at which the structuring fat is definitely liquid;
2. cooling of the mixture under high shear to induce crystallization of the structuring fat to create an emulsion;
3. formation of a fat crystal network to stabilize the resulting emulsion and give the product some degree of firmness;
4. modification of the crystal network to produce the desired firmness, confer plasticity and reduce the water droplet size.

The structuring fat, also called solid fat or hardstock fat, serves to structure the fat phase (being the case in for example a shortening as well as in a water in oil emulsion) and helps to stabilize the aqueous phase, if present, by forming a fat crystal network.

These steps are usually conducted in a process that involves apparatus that allow heating, cooling and mechanical working of the ingredients, such as the churn process or the votator process. The churn process and the votator process are described in the Ullmans Encyclopedia, Fifth Edition, Volume A 16, pages 156-158. Typical examples of such apparatus used in the votator process are the scraped-surface heat exchanger and the pin-stirrer. The role of the pin-stirrers is the working of the product typically during which time the crystallization process further progresses to completion. In low-fat spreads often the pin-stirrer is also the location of phase inversion of the supercooled oil-in-water (O/W) premix into the final W/O emulsion.

A disadvantage of these processes is that the complete composition (including the liquid oil, structuring fat and if present the aqueous phase) is subjected to a heating step and a cooling step, which requires a lot of energy. Another disadvantage of the known processes is that the choice of fats that can practically be used as structuring agent is rather limited.

Alternative processes have been disclosed wherein the structuring fat is added as fat powder (i.e. crystallized fat) thereby eliminating the need to heat the whole composition to above the melting temperature of the structuring fat. An example of such a disclosure can be found in WO2010/069751.

In such an alternative process, since crystallization is carried out separately, the primary objective of the mixing unit is to create a homogenous dispersion of water in a continuous oil phase, with fine droplet size and firm texture. Contrary to the votator process there is no requirement for a minimal residence time based on the time required to complete any crystallization. In fact all residence time beyond performing the mixing and emulsification will merely contribute to viscous heating. The role of the mixing unit in such an alternative process is thus quite different from that of the pin-stirrer and surface-scraped heat exchanger in the traditional votator process. The primary role of the mixer in the alternative process is to be efficient in providing both high dispersive and distributive mixing. In contrast, in a pin-stirrer, high-shear zones for droplet break-up are only present close to the tips of the rotor pins, so only in a small part of the total volume. Therefore, apparatus such as the scraped surface heat exchanger and the pin-stirrer may not be considered an optimal choice as mixing device in a process using fat powder. There is a need for a mixer which provides efficient dispersive and distributive mixing to mechanically work the water phase, oil phase and the fat powder into an edible emulsion, preferably with a short residence of the mixture and a small working volume.

EP 1331988 B1 discloses a fluid dynamic mixer which may be used in fluid to solid mixing applications and may achieve a degree of particle size reduction. In particular, there is disclosed a dynamic mixer comprising two elements which are rotatable relative to each other about a predetermined axis and between which is defined a flow path extending between an inlet for material to be mixed and an outlet, wherein the flow path is defined between surfaces of the elements each of which surfaces defines a series of annular projections centered on the predetermined axis, the surfaces are positioned such that projections defined by one element extend towards spaces between projections defined by the other element, cavities are formed in each surface to define flow passages bridging the projections, cavities formed in one surface being offset in the axial direction relative to cavities in the other surface, and cavities in one surface overlapping in the axial direction with cavities in the other surface such that material moving between the surfaces from the inlet to the outlet is transferred between overlapping cavities. The cavities are characterized by having curved bases.

We have found that when a mixing apparatus, as disclosed in EP1331988 B1, is used in a process to provide dispersions made with fat powder, dispersions of poor quality and/or unpredictable quality may result. In particular, a recurring quality deficit of the spreads made using said mixing apparatus was observed: a large distribution of droplet size, leading to inhomogeneous spreads.

We have further found that said mixing apparatus has a high energy dissipation (a.k.a. energy consumption). Energy consumption leads to increased operational costs and undesired heating of the mixture. Undesired heating of the mixture above a critical temperature may reduce the quality and stability of the resulting edible dispersion.

It is an object of the present invention to provide a mixing apparatus which achieves good distributive and dispersive mixing without leading to undesired heating of the mixture.

It is a further object of the present invention to provide a mixing apparatus capable of being used in a process to prepare edible emulsions and do so in a wide window of operation, in particular a wide range of flow-rates.

It is a further object of the invention to provide a process to prepare an edible dispersion, preferably a dispersion of an aqueous phase in a fat continuous phase, with improved properties such as a small distribution of the droplet size of the dispersed phase.

SUMMARY OF THE INVENTION

It was found that one or more of the above objects is attained by an improved design of the fluid dynamic mixer disclosed in EP 1331988 B1, which is characterized by a specific range of the average cavity diameter in combination with a specific range for the size of the inner element (i.e. the maximum diameter, typically of the rotor). It was found that one or more of the above objects is attained by use of such an improved design in a process to provide edible dispersion, in particular dispersion prepared from ingredients comprising fat powder.

Accordingly, in a first aspect the invention relates to an improved design of the mixing apparatus as disclosed in EP 1331988 B1.

In a further aspect the invention relates to use of the improved mixing apparatus in a range of factory-scale throughput levels, for example from 1 to 20 tons/hour.

In a further aspect invention relates to a method of manufacture of edible dispersion using said mixing apparatus to provide edible dispersion, in particular spreads made fat powder comprising structuring fat.

DETAILED DESCRIPTION OF THE INVENTION

According to a first embodiment of the present invention, there is provided a mixing apparatus comprising two elements which are rotatable relative to each other about a predetermined axis, said two elements being an outer and an inner element, whereby said outer element is circumferent about said inner element, and between which is defined a flow path extending between inlet for material to be mixed and an outlet, wherein the flow path is defined between surfaces of the elements each of which surfaces defines a series of annular projections centered on the predetermined axis, the surfaces are positioned such that projections defined by one element extend towards spaces between projections defined by the other element, cavities are formed in each surface to define flow passages bridging the projections, cavities formed in one surface being offset in the axial direction relative to cavities in the other surface, and cavities in one surface overlapping in the axial direction with cavities in the other surface such that material moving between the surfaces from the inlet to the outlet is transferred between the overlapping cavities, wherein the cavities have curved bases, characterized in that the maximum outer diameter of the inner element, as measured in mm, is greater than 108 plus A, wherein A is the average diameter of the surface area of said cavities times 1.47, and
greater than 8.5 plus B, wherein B is the average diameter of the surface area of said cavities times 3.85, and
smaller than 468, and wherein the diameter, as measured in mm, of the surface area of a cavity, as measured in mm$^2$, is defined as the diameter being derived from a circle with equal surface area as said cavity and, wherein at least one annular projection does not have cavities and is an annular projection with an above average diameter compared to annular projections as defined by the same surface.

Preferably, the mixing apparatus according to the first embodiment of the present invention is a mixing apparatus wherein said maximum outer diameter of the inner element, as measured in mm, is greater than 120 plus A, wherein A is the average diameter of the surface area of said cavities times 2, and
greater than −24 plus B, wherein B is the average diameter of the surface area of said cavities times 4.5, and
smaller than 390, more preferably, greater than 20 plus A, wherein A is the average diameter of the surface area of said cavities times 4.5, and
from 200 to 340, and most preferably, greater than 20 plus A, wherein A is the average diameter of the surface area of said cavities times 4.5, and
from 250 to 300.

According to a second embodiment of the present invention, there is provided a mixing apparatus comprising two elements which are rotatable relative to each other about a predetermined axis, said two elements being an outer and an inner element, whereby said outer element is circumferent about said inner element, and between which is defined a flow path extending between inlet for material to be mixed and an outlet, wherein the flow path is defined between surfaces of the elements each of which surfaces defines a series of annular projections centered on the predetermined axis, the surfaces are positioned such that projections defined by one element extend towards spaces between projections defined by the other element, cavities are formed in each surface to define flow passages bridging the projections, cavities formed in one surface being offset in the axial direction relative to cavities in the other surface, and cavities in one surface overlapping in the axial direction with cavities in the other surface such that material moving between the surfaces from the inlet to the outlet is transferred between the overlapping cavities, wherein the cavities have curved bases, characterized in that the maximum outer diameter of the inner element, as measured in mm, is greater than 108 plus A, wherein A is the average diameter of the surface area of said cavities times 1.47, and
greater than 8.5 plus B, wherein B is the average diameter of the surface area of said cavities times 3.85, and
smaller than 468 plus C, wherein C is the average diameter of the surface area of said cavities times −2.92, wherein the diameter, as measured in mm, of the surface area of a cavity, as measured in mm$^2$, is defined as the diameter being derived from a circle with equal surface area as said cavity.

Preferably, the mixing apparatus according to the second embodiment of the present invention is a mixing apparatus wherein said maximum outer diameter of the inner element, as measured in mm, is greater than 120 plus A, wherein A is the average diameter of the surface area of said cavities times 2, and
greater than 10 plus B, wherein B is the average diameter of the surface area of said cavities times 5, and
smaller than 468 plus C, wherein C is the average diameter of the surface area of said cavities times −3, and preferably, greater than 30 plus A, wherein A is the average diameter of the surface area of said cavities times 5, and
greater than 160, and
smaller than 400 plus C, wherein C is the average diameter of the surface area of said cavities times −3, and most preferably, greater than 30 plus A, wherein A is the average diameter of the surface area of said cavities times 5, and
greater than 160, and
smaller than 400 plus C, wherein C is the average diameter of the surface area of said cavities times −3.

The mixing apparatus according to the invention, comprises an inner element, which preferably is an inner rotor which is housed within an outer element, said outer element preferably being an outer stator. It will be appreciated that the maximum outer diameter of the inner element is less than the minimum inner diameter of the outer element so as to allow full rotation of the inner element or/and full rotation of the outer element. Given the relative dimensions of the inner and outer elements an open annular space is defined between the two components. Therefore, the outer element may be said to be circumferent about said inner element.

The maximum diameter of the inner element typically is equal to the diameter of an annular projection, as defined by the surface of the inner element, which has the largest diameter. In case of irregularly shaped projections, said diameter is an annular projection ascribing the largest circumference when said irregularly shaped projection is swept out about the predetermined axis of rotation.

For a given average diameter of said cavities, the maximum diameter of the inner element, characterizing the mixer according to the invention, can be determined, as provided by the set of simple equations. It will be appreciated that the provided set of equations may be visualized to delimit an area in a XY-graph wherein the maximum outer diameter of the inner element is on the X-axis and the average diameter of the cavities on the Y-axis. As such, the combination of maximum inner rotor diameter and the average diameter of the cavities according to the invention may be easily found.

The surface area of a cavity is determined by covering the cavity with a simple plane and measuring the overlaying area. The plane follows the contours of the annular projection wherein the cavity is formed. In case of irregularly shaped annular projections, said contours are determined by the local contours. As a first example, in case the cavity is formed in a flat surface, its area may be determined by flat plane covering the cavity and measuring the overlaying area. As a second example, in case the cavity is formed in a curved surface, its area may be determined by curved plane covering the cavity, wherein the curve of the plane essentially follows the curve of the local surface area surround the cavity, and measuring the overlaying area. In a third example, in case the cavity spans an edge where two surfaces meet, it will be appreciated that the surface area of the simple plane covering the cavity will essentially be 'folded' over said edge as well.

The diameter of a cavity is defined as the diameter of a circle having an equal surface area as said cavity. Therefore, the average diameter of the cavities may be determined even when some or all cavities have non-circular shapes. The average diameter of the cavities may then be determined by the dividing the sum of the total diameter of all cavities present on the surface of the inner and outer element by the total number of cavities. As a result the average diameter of the surface area of the cavities is known.

It will be appreciated that the mixing apparatus of the current invention has cavities Therefore, the average diameter of the cavities is not zero. The preferred average diameter of the cavities according the first and second embodiment of the invention is from 2 to 119 mm, more preferably from 10 to 80 mm, even more preferably from 15 to 65 mm and most preferably from 25 to 55 mm.

Mixing apparatus according to the more preferred ranges of maximum diameter of the inner element and average cavity diameter have a reduced energy dissipation leading to a lower increase of temperature of the mixture during its residence time in de mixer. A lower energy dissipation also indicates that the mixing apparatus consumes less energy (a.k.a. less power consumption) which reduces operating costs. Another advantage is that said preferred ranges enable the mixing apparatus to have a wider window of operation. The window of operation (a.k.a. flow rate) is determined by the minimum and maximum mixture throughput in tons/hour (i.e. tons per hour) which results in a stable structured edible dispersion. Preferably, the hardstock in such edible dispersions have not undergone a substantial degree of melting during the mixing process. Preferably, such stable dispersions have a dispersed phase with a small drop size or particle size distribution. Without wishing to be bound by theory, it is believed that a substantial degree of melting of the fat powder comprising structuring fat and/or a large variation in drops and/or particles size, constituting the dispersed phase, negatively affects the stability of the resulting dispersions. An unstable dispersion may for instance lose the inversion state or (partially) phase separate upon spreading (a.k.a. break upon spreading).

Preferably, a mixing apparatus according to the second embodiment of the invention, is also a mixing apparatus wherein at least one annular projection does not have cavities and is an annular projection with an above average diameter. For both the first and second embodiment of the invention preferably an annular projection which has the largest diameter compared to annular projections as defined by the same surface lacks cavities. Said lack of cavities in a projection having an above average diameter leads to a further reduction in energy dissipation and temperature increase of the mixture, while still providing sufficient dispersive mixing.

Each annular projection may have an array of circumferentially spaced cavities formed within it. Each of the cavities may be part spherical or of any other geometric form suitable to define a flow path. In addition, each or some of the cavities may be branched such that material flowing along the flow passage defined by a cavity in a single projection is divided into separate streams before it exits that flow passage, or separate streams of material in different branches are combined. Preferably, a mixing apparatus according to the invention is a mixing apparatus wherein at least 50%, preferably at least 75%, more preferably at least 90% and most preferably essentially all of the cavities are part spherical.

Preferably, the number of annular projections has an inverse relationship to the average cavity diameter (i.e. the smaller the average cavity diameter, the larger the number of annular projections as defined by the surface of the inner and outer element). Preferably, a mixing apparatus according to the invention is a mixing apparatus wherein the number of annular projections, as defined by the surface of inner element and outer element is from 4 to 20 and from 4 to 20 respectively, preferably from 5 to 9 and from 5 to 9 respectively and most preferably from 5 to 7 and 5 to 7 respectively.

A cavity may have any suitable volume. The volume of a cavity is defined as the volume enclosed by the base of the cavity and a covering of the cavity with a simple plane overlaying the cavity and following the contours of the annular projection wherein the cavity is formed. For example, in case the cavity is formed in a flat surface, the simple plane is a flat plane covering the cavity. In case of irregularly shaped annular projections, said contours are determined by the local contours. For example, in case the cavity is formed in a curved surface, the plane is a curved plane covering the cavity, wherein the curve of the plane essentially follows the curve of the local surface area surround the cavity. For example, in case the cavity spans an edge where two surfaces meet, it will be appreciated that the simple plane covering the cavity will essentially be 'folded' over said edge as well. Preferably the mixing apparatus according to the invention comprises cavities wherein the volume of said cavities is such that the volume of each cavity is from 0.02 to 10 times, more preferably from 0.05 to 3 times and most preferably from 0.2 to 0.5 times the volume of a sphere having an equal diameter as said cavity.

Preferably, a mixing apparatus according to the invention is a mixing apparatus wherein, the projections defined by one element extend into the space between the projections defined by the other element. The projections therefore may overlap in the direction perpendicular to the flow path so that projections on one element extend into spaces between projections on the other. With such an arrangement there is no free annular space linearly connecting inlet and outlet between the two relatively rotating elements. Whether or not there is such overlap, the probability of material bypassing the cavities defined in the projections is reduced as compared with a conventional cavity transfer mixer. Material entering a cavity in one direction is in effect redirected to exit that cavity in a different direction. Furthermore, the juxtaposition of the cavities in adjacent projections is such that material to be mixed is substantially compelled to transfer from a cavity in one projection to a cavity in the adjacent projection, thereby ensuring that material to be mixed passes alternately between cavities in the two elements. The mixer thus provides a highly effective and efficient distributive mixing action.

Preferably, a mixing apparatus according to the invention is a mixing apparatus wherein each projection is defined between two side surfaces each of which is a surface of revolution swept out by a straight line rotated about the axis. Preferably, a mixing apparatus according to the invention is a mixing apparatus wherein one of the two side surfaces of each projection may define a cylindrical surface centered on the axis, and wherein preferably the other side surface is perpendicular to the axis. The side surfaces may be arranged such that the gap between adjacent projections except where cavities are provided is substantially constant throughout the flow path. Other surface configurations are of course possible, e.g. a surface of revolution swept by one or more curved lines or by more than two straight lines.

Preferably, a mixing apparatus according to the invention is a mixing apparatus wherein the surfaces of the elements which define the projections are generally conical. Therefore, the projections may be shaped such that an inner conical element can be positioned within an outer conical element by relative displacement between the two elements in a direction parallel the rotation axis. Such an arrangement facilitates assembly without requiring one of the elements to be splittable into two halves and also makes it relatively easy to machine or otherwise form the projections and the cavities in the projections. Means may be provided for axially displacing the elements relative to each other during use to control the spacing between the generally conical surfaces. One surface may be defined by an inner surface of a hollow outer member and the other surface may be defined by an outer surface of a solid inner member, the inlet being defined in the outer member. Alternatively that arrangement could be reversed such that the inner member is hollow and the inlet is defined in the inner member. The two elements may define a double cone with a first section of the elements tapering outwards from the inlet and. a second section of the elements tapering inwards to the outlet.

Preferably, a mixing apparatus according to the invention may have adjacent projections which define different numbers of cavities. A mixing apparatus according to the invention may also have adjacent projections which define cavities with different sizes or shapes. At least one element may support an impeller to provide a pumping effect when the two elements are rotated relative to each other.

Embodiments of the present invention will now be described, by way of example, with reference to the accompanying drawings, in which.

Figure 1:
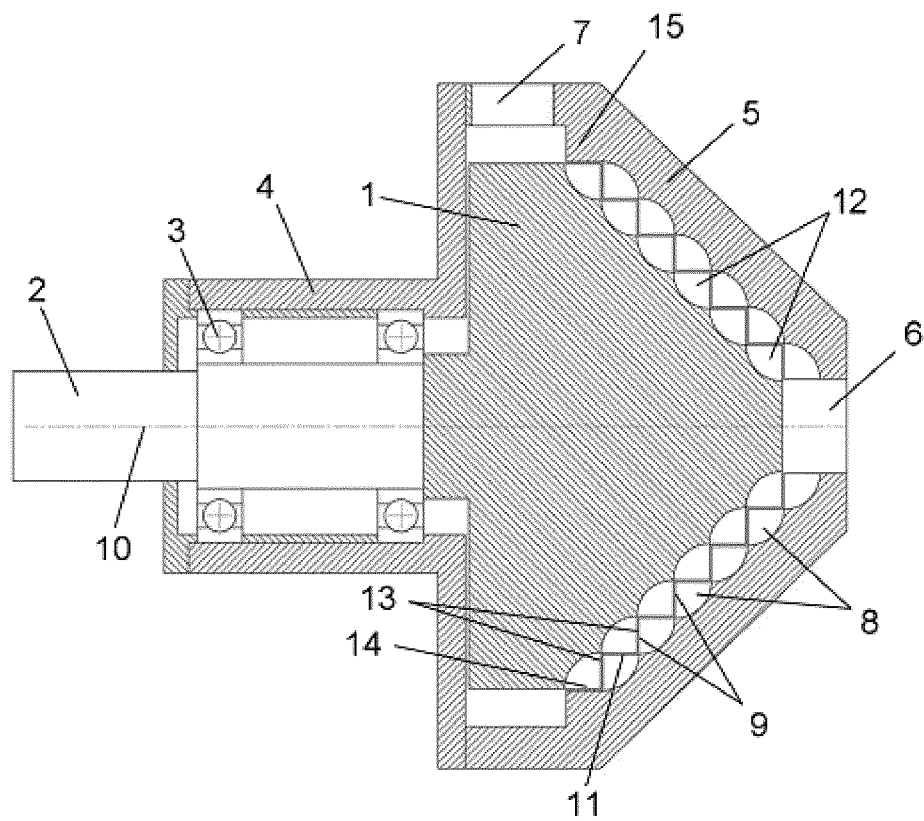
FIG. 1 is an axial cross section through a first embodiment of the invention.

Referring to FIG. 1, the illustrated mixing apparatus comprises a rotor 1 mounted on a shaft 2 supported in bearings 3 within a stator housing 4. A stator 5 is mounted on the stator housing 4. The stator 5 defines a mixer inlet 6 and a mixer outlet 7. An array of seven annular projections 8 extends along the generally conical inner surface of the stator 5, each projection being defined between a first surface 9 which is planar and perpendicular to an axis of rotation 10 and a second surface 11 which is cylindrical and centered on the axis 10.

The rotor 1 supports six projections 12 each of which is defined between a first annular planar surface 13 which is perpendicular to the axis 10 and a second cylindrical surface 14 which is centered on the axis 10. Thus the surfaces 11 and 14 are volumes of revolution swept out by lines parallel to the axis 10 and rotated about that axis. Similarly, the surfaces 9 and 13 are surfaces of revolution swept out by lines perpendicular to the axis 10 and rotated about that axis.

One annular projection 15, being the annular projection with the largest diameter as defined by the inner surface of the stator, does not have cavities.

It will be appreciated that a small gap is defined between the opposed surfaces of the projections 8 and 12. That gap is not however linear and therefore material passing from the inlet 6 to the outlet 7 cannot follow a linear path. In addition to this general configuration however a series of cavities is provided in each of the projections 8 and 12. These cavities are not shown in FIG. 1 with a view to avoiding over-complication of FIG. 1 but the cavities are shown in FIGS. 2 to 4.

Figure 2:
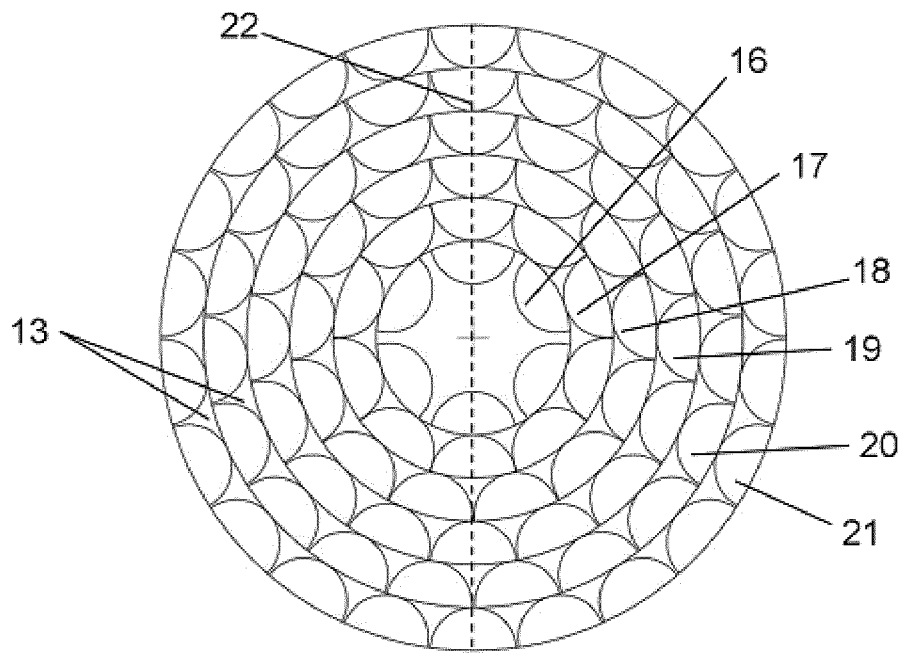
FIG. 2 is an end view of an inner rotor element of the assembly of FIG. 1.

Referring to FIG. 2, the planar surfaces 13 which define one side of each of the projections 12 is shown. In each of these planar surfaces an equally spaced array of cavities is formed. In the innermost projection, six cavities 16 are formed. In the next projection, ten cavities 17 are formed. In the next projection, thirteen cavities 18 are formed. In the next projection, sixteen cavities 19 are formed. In the next projection, nineteen cavities 20 are formed. In the outer projection, twenty-two cavities 21 are formed. Each of the cavities is part-spherical and arranged such that the periphery of each cavity just extends across the full width of the surface 13 and the full width of the surface 14. Indicated is the maximum outer diameter of the inner rotor element 22.

Figure 3:
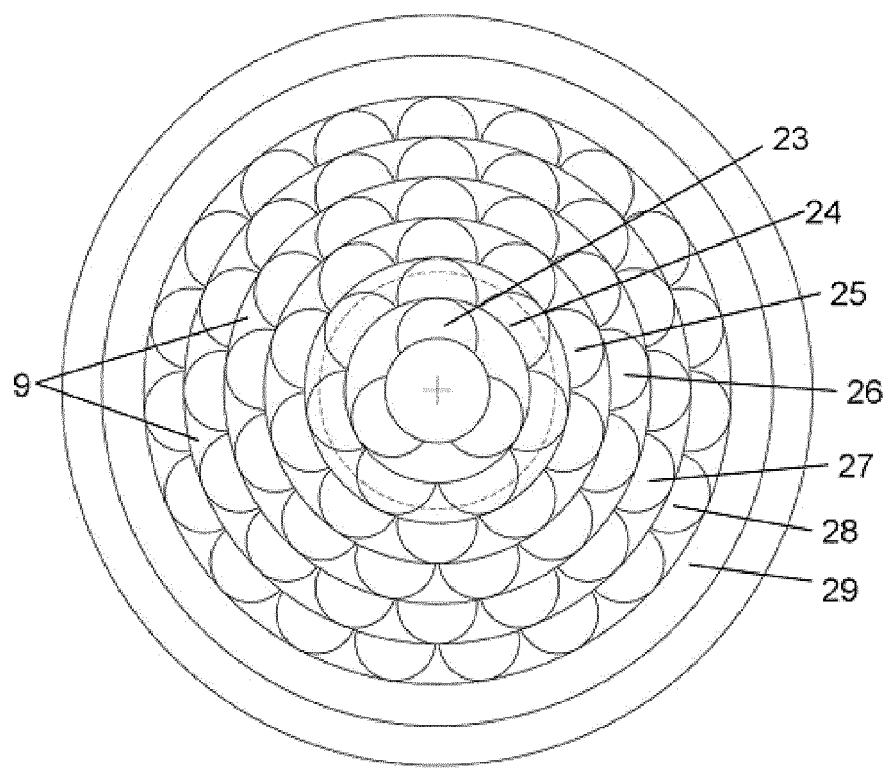
FIG. 3 is an end view of an outer stator element of the assembly of FIG. 1.

Referring to FIG. 3, this shows the cavities formed in the outer stator element of the mixing device illustrated in FIG. 1 and the central aperture defining the mixer inlet 6. Seven surfaces 9 extend around the inlet and an array of cavities is formed in most of the surfaces 9. There are three cavities 23 in the innermost array, seven cavities 24 in the next array, ten cavities 25 in the next array, thirteen cavities 26 in the next array, sixteen cavities 27 in the next array, nineteen cavities 28 in the next array, and no cavities in the outermost surface. Each of the cavities, when present, is formed so as to just extend fully across the surface 9 and fully across the surface 11 defining the other side of the projection.

Figure 4:
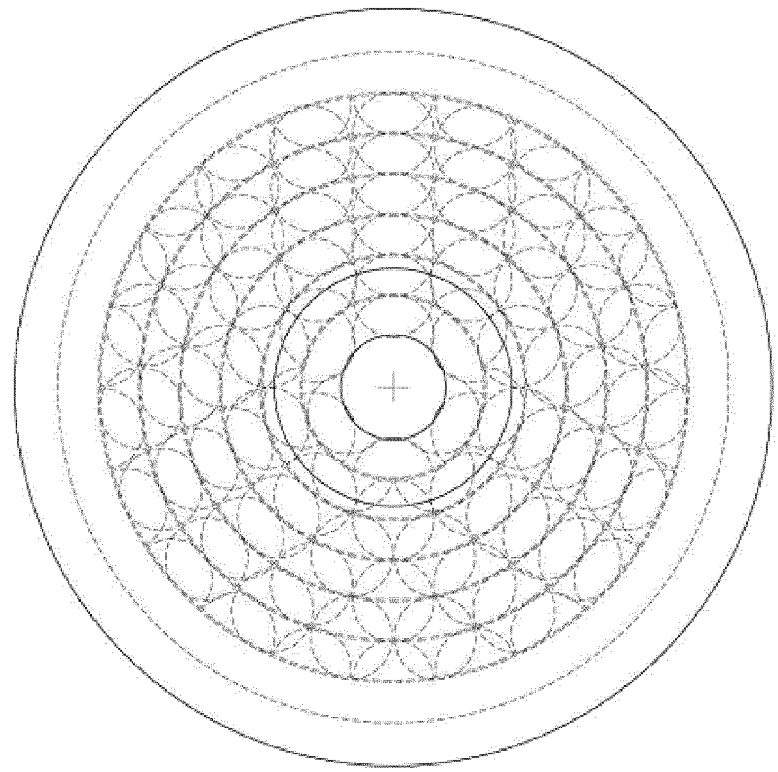
FIG. 4 represents the relative disposition of cavities in the two elements which are combined in the assembly of FIG. 1.

FIG. 4 shows the relative disposition of the various cavities in the two components of the mixing apparatus of the first embodiment. Given that adjacent projections define differing numbers of cavities, the paths of least resistance through the mixer vary continuously as the rotor turns within the stator. Material to be mixed thus follows a complex path which ensures adequate mixing.

Figure 5:
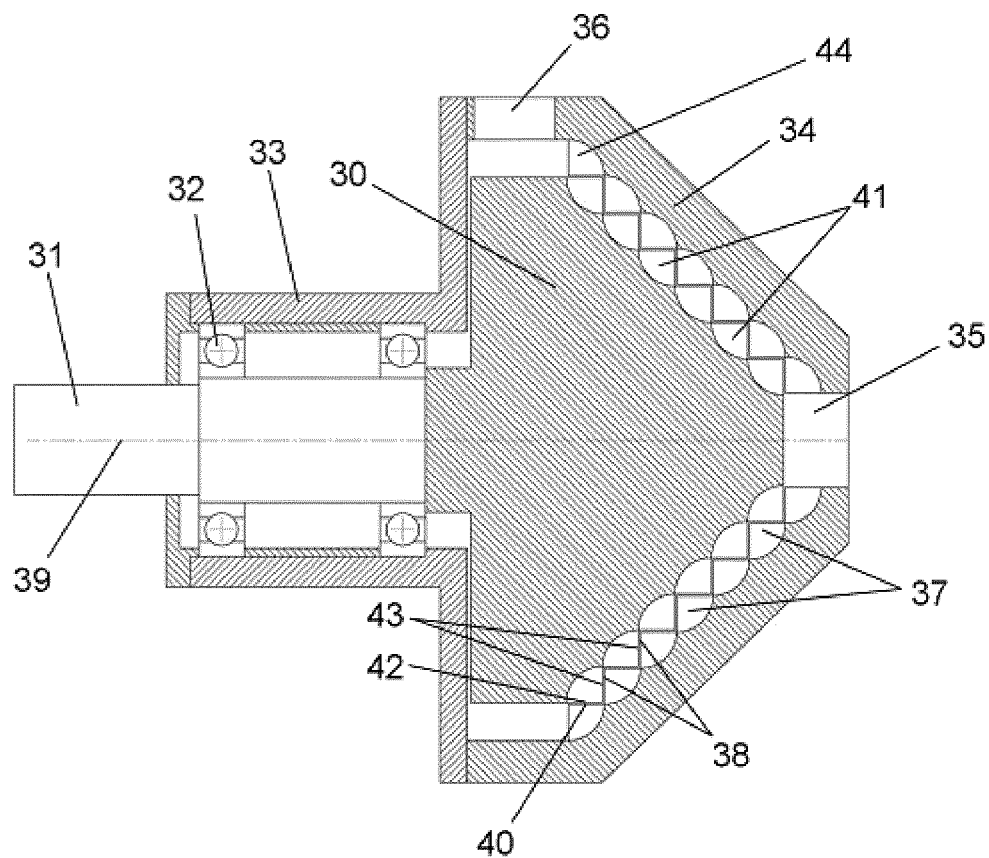
FIG. 5 is an axial cross section through a second embodiment of the invention

FIG. 5 illustrates a mixing apparatus according to a second embodiment of the invention. The illustrated mixing apparatus comprises a rotor 30 mounted on a shaft 31 supported in bearings 32 within a stator housing 33. A stator 34 is mounted on the stator housing 33. The stator 34 defines a mixer inlet 35 and a mixer outlet 36. An array of seven annular projections 37 extends along the generally conical inner surface of the stator 34, each projection being defined between a first surface 38 which is planar and perpendicular to an axis of rotation 39 and a second surface 40 which is cylindrical and centered on the axis 39. In contrast to the mixing apparatus illustrated in FIG. 1, all annular projections defined by the inner surface of the stator have cavities. Thus also the outermost annular projection 44 has cavities.

Figure 6:
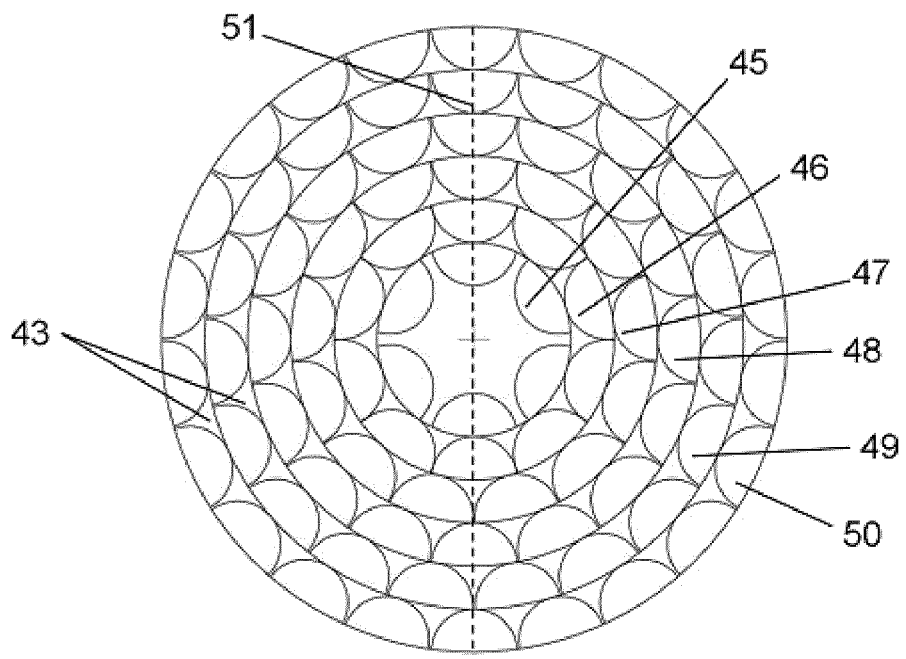
FIG. 6 is an end view of an inner rotor element of the assembly of FIG. 5.

Referring to FIG. 6, the planar surfaces 43 which define one side of each of the projections 41 is shown. In each of these planar surfaces an equally spaced array of cavities is formed. In the innermost projection, six cavities 45 are formed. In the next projection, ten cavities 46 are formed. In the next projection, thirteen cavities 47 are formed. In the next projection, sixteen cavities 48 are formed. In the next projection, nineteen cavities 49 are formed. In the outer projection, twenty-two cavities 50 are formed. Each of the cavities is part-spherical and arranged such that the periphery of each cavity just extends across the full width of the surface 43 and the full width of the surface 42. Indicated is the maximum outer diameter of the inner rotor element 51.

Figure 7:
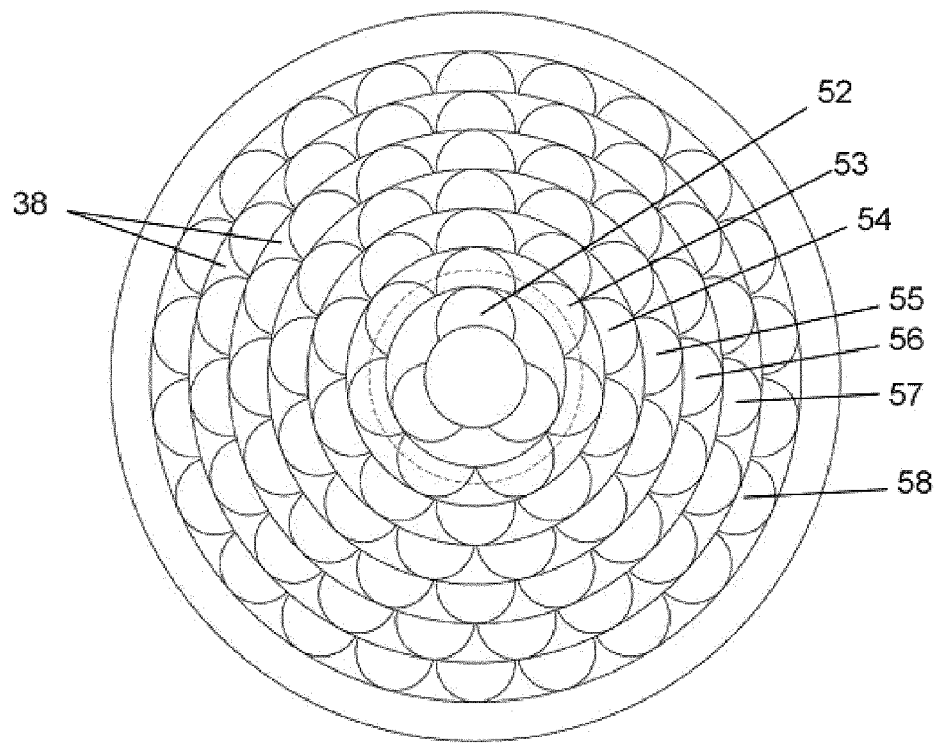
FIG. 7 is an end view of an outer stator element of the assembly of FIG. 5.

Referring to FIG. 7, this shows the cavities formed in the outer stator element of the mixing device illustrated in FIG. 5 and the central aperture defining the mixer inlet 35. Seven surfaces 38 extend around the inlet and an array of cavities is formed the surfaces 38. There are three cavities 52 in the innermost array, seven cavities 53 in the next array, ten cavities 54 in the next array, thirteen cavities 55 in the next array, sixteen cavities 56 in the next array, nineteen cavities 57 in the next array, and twenty-two cavities 58 in the outermost surface. Each of the cavities, when present, is formed so as to just extend fully across the surface 38 and fully across the surface 40 defining the other side of the projection.

Figure 8:
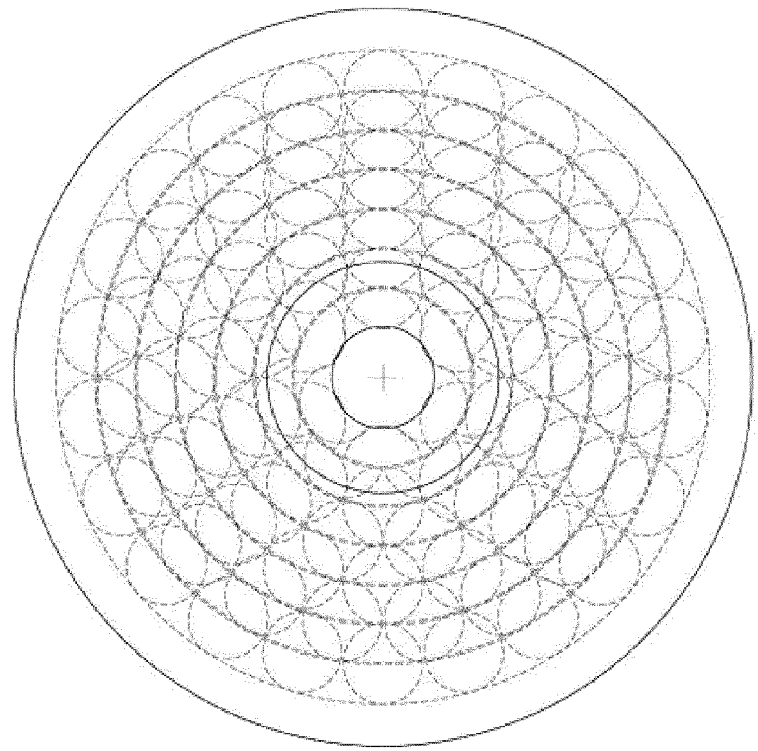
FIG. 8 represents the relative disposition of cavities in the two elements which are combined in the assembly of FIG. 5.

FIG. 8 shows the relative disposition of the various cavities in the two components of the mixing apparatus as illustrated in FIG. 5. Given that adjacent projections define differing numbers of cavities, the paths of least resistance through the mixer vary continuously as the rotor turns within the stator. Material to be mixed thus follows a complex path which ensures adequate mixing.

The gap between the two relatively rotating elements where no cavities are provided results in a highly effective and efficient dispersive mixing action by subjecting the material to be mixed to intensive shear stresses. Adjustment of the relative axial positions of the rotor and stator although not possible in the arrangement shown in FIG. 1 and FIG. 5 would provide additional control of the spacing between the surfaces 9 and 13, as between the surfaces 43 and 38, so as to provide an additional adjustable control mechanism. Such adjustment would result in different levels of shear stressing on the material being transferred between cavities in the adjacent elements. Such a variation could be performed during manufacture or during operation by providing a mechanism to control axial movement of one element relative to the other.

The flow path of material passing through the gap between the elements is dominated by the movement of the majority of the material passing from a flow passage defined by a cavity in one projection on one element to a flow passage defined by a cavity in an adjacent projection on the other element. This action prevents material from passing through the mixer without entering the flow passages defined by the cavities.

The mixer comprises interfacial surfaces at varying distances from the axis of rotation. The difference in the kinetic energy imparted by these surfaces to a material being mixed provides a motive force to the material that tends to propel it through the mixer. The result is a pumping action which reduces the possibility of material becoming lodged within the mixer. It will be appreciated that the arrangement could be reversed however such that the material is forced, by some external pumping means, to flow radially inwards, reversing the inlet and outlet. In such circumstances the inherent centrifugal pumping action provides back pressure and a more intensive mixing action. An application of such an arrangement would be as an in-line mixer in which some degree of back-mixing is required.

The flow passages defined by the cavities can be shaped to increase the pumping action and the propulsive forces thus obtained can be used to pump material through the mixer and to empty the mixer at the end of its mixing operation. As a result this pumping action makes it possible to use the mixer both as an in-line mixing device and a batch mixing device.

A structure such as that illustrated in FIGS. 1 to 4 and FIGS. 5 to 8 is relatively easy to manufacture given that the surfaces of the two elements in which the projections and cavities are formed are accessible along one axis.

In the illustrated embodiments the flow passages are part-spherical but it will be appreciated that different cavity shapes, sizes and. numbers could be provided having either curved or rectilinear sides.

Given that the number and/or size and/or shape of the cavities may be varied as between adjacent projections, generally in accordance with the pitch circle radius of the projections around the axis of rotation, the material to be mixed is forced to split into different streams as it passes through the mixer. This ensures a relatively good mixing performance. Each of the flow passages presents a well defined entrance zone and exit zone to material passing from the inlet to the outlet. The relative sizes of these entrance and exit zones could be controlled so as to be different within one cavity, within one row of cavities, or between rows of cavities. This ability to vary the relative sizes between entrances and exits to cavities enables the local flow characteristics to be adjusted to provide varying flow velocities and pressures. For example, decreasing the local cross-sectional area of a flow passage defined by a cavity would increase the velocity of the flow through the cavity and decrease its pressure. The ability to vary the relative sizes between entrances and exits also permits the material flowing from a relatively large exit to be more finely divided by compelling it to flow into relatively smaller entrances formed by the downstream cavities. This enables the distributive and dispersive mixing characteristics to be adjusted and optimized. This effect may be further enhanced by causing an individual cavity to be branched between its entrance and exit. Thus a number of entrances may be joined to a single exit, or a single entrance may be joined to a number of exits. This would further increase the distributive mixing action obtained by combining the streams of material passing through individual cavities either within or between adjacent cavities.

In the embodiment of FIGS. 1 to 8, the surfaces 9 and 11 are mutually perpendicular as are the surfaces 13 and 14, as are the surfaces 38 and 40, as are the surfaces 43 and 42. Other arrangements are possible however, for example where the surfaces 11 and 14 are generally frusto-conical with the cones centered on the axis.

Various advantages arise with the mixer in accordance with the present invention as compared with conventional cylindrical configuration cavity transfer mixers. In particular, the projections define a large number of mutually inclined surfaces which ensure inter-cavity transfers between the two mutually rotating elements, The projections define a large number of cutting edges and the absence of an open annular space between the two elements ensures that all the material to be mixed is exposed to active mixing. With mixers in accordance with the invention in which a generally conical structure is provided and the number and/or size and/or shape of cavities per projection varies, the differences between the cavities of adjacent projections as the material progresses through the mixer can be such as to ensure material is forced to split into different streams as it passes between adjacent projections.

As noted above, different cavity shapes may be used to adjust characteristics. The cavity shapes can be selected for example to maximize centrifugal pumping action, even to the extent of being curved into the form of vanes in the manner of a conventional centrifugal pump. Cavity shapes can also be selected to optimize vortex formation within any individual cavity and interactions between such vortices, to optimize flow velocities and pressures, and to enhance the degree of distributive mixing between consecutive projections. Gaps could be provided between adjacent projections to ensure that additional blending zones are defined which generate multiple vortices. This can be achieved simply by omitting one of the projections from a central section of the embodiment of FIG. 1 or FIG. 5 for example. Alternatively, some projections may be formed without any cavities 15; or cavities may be formed in the troughs between adjacent projections rather than being centered on the peaks of the projections as in the illustrated embodiments.

Designs may be compact to make it possible to achieve a low-pressure drop through the mixer. Mixers can be designed to optimize self-cleaning through centrifugal pumping action. With conical arrangements manufacture is relatively simple. Monolithic constructions may be provided to avoid problems with sealing splittable components. The designs can be mechanically robust, can be provided with additional injection ports. Multiple injection port suitably allow two or more compounds to be added to the mixing apparatus in separate streams. Furthermore, depending on the position of the injection ports along the mixing apparatus the degree of distributive and dispersive mixing of a compound stream may be varied. For example, in case the outer element is a stator, injection ports may be provided at any suitable points along the stator. For example, in case the flow direction is radially outwards in a conical arrangement of an outer stator element and a inner rotor element, positioning of an additional injection port at a point along the axial direction of the mixing apparatus where the annular projections have relatively large diameters compared to all annular projections present, allows injection of a second compound stream which undergoes less distributive and dispersive mixing. It will be appreciated that essentially the complete mixture may be added by said second injection port to control the degree of dispersive and distributive mixing of the complete mixture.

Suitable heating/cooling capability can be easily built in. Flow directions may be reversible, although a radially outwards flow in a conical arrangement would be preferred if it is desired to minimize structural pressure drops and to provide a pumping action. Either the Inner rotor element or the outer stator element or both could be rotatable. In some configurations material could be simply pumped through the assembly to achieve a static mixing action. Occasions on which the mixer is used as a static mixer will probably only arise in special circumstances, e.g, when minimal mixing is required for a particular product and it would be advantageous not to remove the mixer from a processing line, or during start-up of a process. Thus the mixer can provide some useful additional functionality as a static mixer.

It will be appreciated that mixing devices in accordance with the present invention could be combined with auxiliary equipment, for example arrangement to cut material into smaller pieces prior to mixing.

The apparatus of the present invention is extremely versatile and can be used in many different applications. For example, the apparatus can be used in all fluid to fluid mixing and fluid to solid mixing applications, including solids that exhibit fluid like flow behavior. The fluids may be liquids and gases delivered in single and multiple streams. The apparatus can be used for all dispersive and distributive mixing operations including emulsifying, homogenizing, blending, incorporating, suspending, dissolving, heating, size reducing, reacting, wetting, hydrating, aerating and gasifying for example. The apparatus can be applied in either batch or continuous (in line) operations. Thus the apparatus could be used to replace conventional cavity transfer mixers, or to replace standard industrial high shear mixers. The apparatus could also be used in domestic as well as industrial applications.

The apparatus enables performance levels to be achieved which are far better than those of current state of the art mixers. In particular the mixing apparatus achieves good distributive and dispersive mixing with low energy dissipation, increase of the temperature of the mixture during its residence times in the mixer, and the size distribution of the dispersed phase in an emulsion. Furthermore the apparatus is suited to operate in a wide range of throughput levels (a.k.a. flow rate) of mixtures which are sensitive to overworking.

The present invention also provides a method of mixing using an apparatus as defined above, in the preparation of an edible emulsion, preferably an emulsion made from ingredients comprising fat powder, which results in good distributive and dispersive mixing and low energy dissipation, reduced temperature increase of the mixture and a reduced risk of overworking of the mixture.

For the purpose of the invention ambient temperature is defined as a temperature of about 20 degrees Celsius. The terms 'oil' and 'fat' are used interchangeably unless specified otherwise and concern edible oils and fats. Where applicable the prefix 'liquid' or 'solid' is added to indicate if the fat or oil is liquid or solid at ambient temperature as understood by the person skilled in the art. The term 'hardstock' refers to a fat that is solid at ambient temperature.

The present invention also provides a method of using an apparatus as defined above in the manufacture of an edible dispersion, preferably a water-in-oil dispersion, comprising the step of mixing an aqueous phase and a fat phase, wherein said fat phase comprises fat powder, in a mixing apparatus, according to the invention. Such edible dispersions manufactured with said mixing apparatus may have a reduced size distribution of the dispersed phase and improved stability. For example, water-in-oil dispersions made according to said process in a mixing apparatus according to the invention may have an reduced size distribution of the aqueous phase droplets.

The fat powder according to the invention comprises structuring fat. The structuring fat may help to stabilize the edible dispersion. The crystallization and melting properties of the structuring fat are important as they influence the stability of the edible dispersion, e.g. syneresis and plasticity, as well as the organoleptic properties, e.g. oral melting behavior and flavor release. It will be appreciated that the amount of structuring fat necessary for imparting structure to an edible composition depends on the desired structure. For a stable spread, for example, a certain amount of structuring fat is necessary. If the amount of structuring fat is too low, a stable emulsion may not be obtained and the resulting emulsion may not comprise the typical plasticity of a spread.

The fat powder comprises structuring fat and preferably comprises at least 80 wt. % of structuring fat, more preferably at least 85 wt. %, even more preferably at least 90 wt. %, still more preferably at least 95 wt. % and most preferably at least 98 wt. %. Most preferably the edible fat powder essentially consists of structuring fat.

The structuring fat may be a single fat or a mixture of different fats. The structuring fat may be of vegetable, animal or marine origin. Preferably at least 50 wt. % of the structuring fat (based on total amount of structuring fat) is of vegetable origin, more preferably at least 60 wt. %, even more preferably at least 70 wt. %, still more preferably at least 80 wt. %, even still more preferably at least 90 wt. % and even still more further preferably at least 95 wt. %. Most preferably the structuring fat essentially consists of structuring fat of vegetable origin.

The fat powder may comprise any suitable oil or fat. Preferred oils and fats are those known for the production of margarine and margarine derivatives such as low fat spreads. The oil and fat are for example selected from the group comprising sunflower oil, rapeseed oil, palm oil, coconut oil, soy bean oil, palm kernel oil, butter fat or a combination thereof. Preferably the liquid oil is selected from the group consisting of sunflower oil, rapeseed oil, soybean oil, linseed oil, maize oil and combinations thereof. Preferably the structuring fat is selected from the group consisting of palm oil, palm kernel oil, coconut oil and combinations thereof.

The structuring fat as present in the edible fat powder preferably has a solid fat content N10 from 50 to 100, N20 from 26 to 95 and N35 from 5 to 60.

Preferably, the structuring fat is made by a method such as Super Critical Melt Micronisation (ScMM), also known as particles from gas saturated solutions (PGSS). This is a commonly known method and is for example described in J. of Supercritical Fluids 43 (2007) 181-190 and EP1651338.

It is important that the fat powder is not subjected to temperatures at which the structuring fat melts as this may severely reduces the ability of the structuring fat to stabilize the edible dispersion. Edible dispersion which are poorly structured may be characterized by a large average size of the drop size of the dispersed phase. The drop size is measured by D3,3 and a D3,3 of >15 um is characteristic of a poorly stable edible dispersions. It will be appreciated that not only the average drop size is a feature of the stability of an edible dispersions but also the size distribution of said droplets. In other words, a small fraction of big drops may also reduce the stability of the edible dispersion. For example such large individual droplets may form unstable 'watery' patches or, depending on the type of dispersion, 'oily' patches. The size distribution of the dispersed phase is indicated by the e^sigma value. An e^sigma value of more then 2.0 indicates a poorly structured edible dispersion, not resulting in a good quality spread.

The temperature at which the structuring fat melts depends on the structuring fat as used and can routinely be determined for example based on the solid fat content profile (i.e. N-lines) of the structuring fat. Preferably the fat powder, after production, has not been subjected to temperatures above 25 degrees Celsius, more preferably 15, even more preferably 10 and most preferably 5.

Subjecting the structuring fat to temperatures at which the structuring fat melt leads is also known as overworking. The risk of overworking of the mixture may result from energy dissipation during the mixing process. The energy dissipation of a mixing apparatus may be estimated by its power consumption. Said energy dissipation may lead to a rise in temperature of the mixture during its residence time in the mixing apparatus. The rise in temperature of the mixture may result in (partial) melting of the fat powder. Fat powder which has undergone complete or partial melting will have a reduced ability to structure edible dispersions, resulting in edible dispersions of a reduced stability and/or quality. Preferably the temperature increase of the mixture during its residence time in the mixing apparatus is less than 6 degrees, more preferably less than 4 degrees en most preferably less than 2 degrees.

The temperature increase of the mixture may thus be affected by the energy dissipation of the mixing apparatus and the residence time of the mixture in the mixing apparatus. The energy dissipation may be related to the power consumption of the mixing apparatus. Said power consumption typically varies according to the mixing speed of the mixing apparatus when in operation, as measured in rpm (i.e. revolutions per minute). Preferably, the mixing device according to the invention has a power consumption of less than 4 kW (kilowatt) at an rpm of 600, less than 6 kW at an rpm of 750, less than 10 kW at an rpm of 900, less than 15 kW at an rpm of 1050 and less than 20 kW at an rpm of 1200. It will be appreciated that said combinations of rpm and kW may by visualized as points in a XY-graph with the rpm on a X-axis and the kW on the Y-axis. Said points may be connected by a simple line wherein preferred combinations of power consumption and rpm, according to a mixing apparatus of the invention may be found on and below said simple line.

It will be appreciated that a dynamic mixer according to the invention may be operated at a variety of mixing speeds (rpm). We have found that a method of manufacture of an edible water-in-oil dispersion, wherein the mixing device is operated at a throughput from between 0.1 to 25 tons/hour and a rpm from 300 to 7500, preferably from 2 to 15 tons/hour and a rpm from 600 to 4500, and most preferably from 3 to 8 tons/hour and a rpm from 750 to 1500 rpm, may result in emulsions with a reduced size distribution of the aqueous phase, wherein the temperature of the mixture has increased less than 4 degrees Celsius during its residence time in the mixing apparatus.

The invention is now illustrated by the following non-limiting examples.

EXAMPLES

Water Droplet Size Distribution of Spreads (D3,3 Measurement)

The normal terminology for Nuclear Magnetic Resonance (NMR) is used throughout this method. On the basis of this method the parameters D3,3 and exp($\sigma$) (a.k.a. e^sigma) of a lognormal water droplet size distribution can be determined. The D3,3 is the volume weighted mean droplet diameter and $\sigma$ is the standard deviation of the logarithm of the droplet diameter.

The NMR signal (echo height) of the protons of the water in a water-in-oil emulsion are measured using a sequence of 4 radio frequency pulses in the presence (echo height E) and absence (echo height E*) of two magnetic field gradient pulses as a function of the gradient power. The oil protons are suppressed in the first part of the sequence by a relaxation filter. The ratio (R=E/E*) reflects the extent of restriction of the translational mobility of the water molecules in the water droplets and thereby is a measure of the water droplet size. By a mathematical procedure—which uses the log-normal droplet size distribution—the parameters of the water droplet size distribution D3,3 (volume weighed geometric mean diameter) and $\sigma$ (distribution width) are calculated.

A Bruker magnet with a field of 0.47 Tesla (20 MHz proton frequency) with an air gap of 25 mm is used (NMR Spectrometer Bruker Minispec MQ20 Grad, ex Bruker Optik GmbH, DE).

The droplet size of the spread is measured, according to the above described procedure, of a spread stabilized at 5 degrees Celsius right after production for 5 days. This gives the D3,3 and e^sigma after stabilization at 5 degrees Celsius.

Two mixing apparatus designs were build. Example 1 was designed according to the invention and Comparative A was designed not according to the invention. Essentially, Comparative A is a design based on EP 1331988 B1. Table 1 show several differing design characteristics of Example 1 and Comparative A (Table 1).

TABLE 1

Composition of example 1 and comparative C1, design of the mixing apparatus.

|  | Example 1 | Comparative A |
|---|---|---|
| Maximum rotor diameter of inner element (mm) | 290 | 350 |
| Average cavity diameter (mm) | 40 | 70 |
| Number of annular projections stator with cavities | 6 | 5 |
| Number of annular projections stator with no cavities | 1 | 0 |
| Number of annular projections rotor with cavities | 6 | 4 |

Power Consumption

The average power consumption, as measured in kW (kilowatt), was determined of Example 1 and the Comparative A during operation at various mixing speeds, as measured in revolutions per minute (rpm) (Table 2). A similar mixture was used in the power consumption measurement for Example 1 and Comparative A and essentially was a mixture with composition A (see below).

TABLE 2 average power consumption of Example 1 and the Comparative A at various rpm.

| | Power consumption (kW) | |
|---|---|---|
| rpm | Example 1 | Comparative A |
| 600 | 2.5 | 6.0 |
| 750 | 4.5 | 10.1 |
| 900 | 6.9 | 15.9 |
| 1050 | 9.3 | 24.8 |
| 1200 | 13.4 | 35.7 |

The power consumption of Example 1 is 2-3 times lower then the power consumption of Comparative A across a range of mixing speeds.

The ability of the mixing apparatus Example 1 and Comparative A to provide good quality water-in-oil dispersions was assessed using the compositions A and B Table 3.

TABLE 3

Formulation of Compositions A and B

| | Composition A Wt. % | | Composition B Wt. % |
|---|---|---|---|
| Aqueous phase | | Aqueous phase | |
| Salt | 0.3 | Salt | 0.75 |
| Flavours | 0.001 | Gelatin | 1 |
| Citric acid | 0.0033 | Merigel | 4 |
| Vitamins | 0.007 | BMP | 0.55 |
| | | Sorbate | 0.18 |
| water | To balance 55 | water | To balance 72 |
| Fat phase | | Fat phase | |
| Fat powder | 5.4 | Fat powder | 4.3 |
| Lecithin | 0.2 | Dimodan HP | 0.2 |
| Dimodan HP | 0.2 | Flavours | 0.01 |
| Rapeseed Oil | 0.47 | Vitamins | 0.03 |
| Flavours | 0.01 | beta-carotene | 0.002 |
| Vitamins | 0.03 | | |
| beta-carotene | 0.0015 | | |
| 24:76 wt. % mix of linseed and sunflower oil | to balance 45 | Sunflower oil | to balance 28 |

Dimodan ® HP: molecularly distilled mono/diacylglyceride mixture derived from fully hardened palm oil (90% monoglyceride) ex Danisco DK.
BMP: butter milk protein.
Fat powder (inES48) is a fat powder of inES48 that was obtained using a supercritical melt micronisation process similar to the process described in Particle formation of ductile materials using the PGSS technology with supercritical carbon dioxide, P. Münüklü, Ph.D.Thesis, Delft University of Technology, 16-12-2005, Chapter 4, pp. 41-51. inES48: an interesterified mixture of 65% dry fractionated palm oil stearin with an Iodine Value of 14 and 35% palm kernel oil.

The mixing apparatus Example 1 or Comparative A were used to manufacture spreads based on starting composition A or B, at various mixture throughput level (a.k.a. flow rate) in tons per hour (tons/hour). Before mixing the temperature of the aqueous phase was equal to or below 15 degrees Celsius and the temperature of the fat phase was equal to or below 21 degrees Celsius. The aqueous-phase and fat-phase were fed to the mixer via a single inlet via a Y-junction.

The resulting products were characterized in terms of droplet size (D3,3 in um) and corresponding e^sigma (Table 4 and Table 5).

TABLE 4 process conditions and characteristics of the water-
in-oil dispersions made starting from composition A.

| flow rate | mixer speed | Comparative A | | Example 1 | |
|---|---|---|---|---|---|
| (tons/hour) | (rpm) | D3,3 (um) | e^sigma | D3,3 (um) | e^sigma |
| 3.6 | 600 | n.d. | n.d. | 15.6 | 2 |
|  | 750 | 5.1 | 1.8 | n.d. | n.d. |
|  | 900 | 4.2 | 2 | 5.57 | 1.88 |
|  | 1050 | 3.8 | 2.2 | 5.16 | 1.87 |
|  | 1200 | n.d. | n.d. | 4.27 | 1.92 |
| 7.2 | 900 | 5.5 | 2.1 | 7.03 | 2.09 |
|  | 1050 | 5 | 2.5 | n.d. | n.d. |
|  | 1200 | 3.5 | 2.3 | 5.19 | 1.91 |
|  | 1350 | n.d. | n.d. | 4.59 | 1.9 | n.d.: not determined

TABLE 5 process conditions and characteristics of the water-
in-oil dispersions made starting from composition B.

| flow rate | mixer speed | Comparative A | | Example 1 | |
|---|---|---|---|---|---|
| (tons/hour) | (rpm) | D3,3 (um) | e^sigma | D3,3 (um) | e^sigma |
| 3.6 | 600 | 16 | 2.9 | n.d. | n.d. |
|  | 750 | n.d. | n.d. | n.d. | n.d. |
|  | 900 | 14 | 3.3 | 18.6 | 2.2 |
|  | 1050 | 14.6 | 3.3 | 17.6 | 1.79 |
|  | 1200 | n.d. | n.d. | 13.35 | 1.93 |
| 5.4 | 600 | 13.9 | 2.5 | n.d. | n.d. |
|  | 750 | 13.2 | 2.8 | n.d. | n.d. |
|  | 900 | 13.6 | 3.1 | 20.7 | 1.81 |
|  | 1050 | 12.7 | 3.1 | 18.2 | 1.88 |
|  | 1200 | 14 | 3.1 | 14.82 | 1.91 |
| 7.2 | 600 | 13.8 | 2.5 | n.d. | n.d. |
|  | 750 | 11 | 2.7 | n.d. | n.d. |
|  | 900 | 12.9 | 3.3 | 22.4 | 1.78 |
|  | 1050 | 12 | 3.2 | 18.6 | 1.84 |
|  | 1200 | 12.7 | n.d. | 15.9 | 1.9 |
|  | 1350 | n.d. | n.d. | 13.91 | 1.88 | n.d.: not determined

Good quality water-in-oil dispersions indicates a D3,3<15 um and a small distribution size of the dispersed phase (i.e. a low e^sigma). An edible dispersion with an e^sigma above 2.0 does not result in a good quality spread, such spread individual droplets which may be very large and form unstable 'watery' patches. From the results in tables 4 and 5 it is clear that both mixing apparatus can produce water-in-oil dispersion with an acceptable average droplet size (i.e. a D3,3<15 um) at various levels of throughput. However, tables 4 and 5 also clearly show an reduced e^sigma of the drop size as a result of mixing with the improved design of Example 1 at a wide range of throughput levels.

The invention claimed is:

1. A mixing apparatus comprising two elements (1,5) which are rotatable relative to each other about a predetermined axis (10), said two elements being an outer (5) and an inner element (1), whereby said outer element is circumferent about said inner element, and between which is defined a flow path extending between inlet (6) for material to be mixed and an outlet (7), wherein the flow path is defined between surfaces of the elements (9,11,13,14) each of which surfaces defines a series of annular projections (8;12) centered on the predetermined axis (10), the surfaces are positioned such that projections defined by one element (1) extend towards spaces between projections defined by the other element (5), cavities are formed in each surface to define flow passages bridging the projections (8;12), cavities formed in one surface being offset in the axial direction relative to cavities in the other surface, and cavities in one surface overlapping in the axial direction with cavities in the other surface such that material moving between the surfaces from the inlet to the outlet is transferred between the overlapping cavities, wherein the cavities (16,17,18,19, 20,21; 23,24,25,26,27,28) have curved bases, characterized in that the maximum outer diameter of the inner element (22), as measured in mm, is
   greater than 108 plus A, wherein A is the average diameter of the surface area of said cavities times 1.47, and
   greater than 8.5 plus B, wherein B is the average diameter of the surface area of said cavities times 3.85, and
   smaller than 468, and
wherein the diameter, as measured in mm, of the surface area of a cavity, as measured in $mm^2$, is defined as the diameter being derived from a circle with equal surface area as said cavity and, wherein at least one annular projection does not have cavities (15) and is an annular projection with an above average diameter compared to annular projections as defined by the same surface.

2. A mixing apparatus according to claim 1, wherein said maximum outer diameter of the inner element (22), as measured in mm, is
   greater than 120 plus A, wherein A is the average diameter of the surface area of said cavities times 2, and
   greater than −24 plus B, wherein B is the average diameter of the surface area of said cavities times 4.5, and
   smaller than 390,
and preferably,
   greater than 20 plus A, wherein A is the average diameter of the surface area of said cavities times 4,5, and
   from 200 to 340,
and most preferably,
   greater than 20 plus A, wherein A is the average diameter of the surface area of said cavities times 4.5, and
   from 250 to 300.

3. A mixing apparatus comprising two elements (30, 34) which are rotatable relative to each other about a predetermined axis (39), said two elements being an outer and an inner element, whereby said outer element is circumferent about said inner element, and between which is defined a flow path extending between inlet (35) for material to be mixed and an outlet (36), wherein the flow path is defined between surfaces of the elements (38,40,42,43) each of which surfaces defines a series of annular projections (37; 41) centered on the predetermined axis (39), the surfaces are positioned such that projections defined by one element (37) extend towards spaces between projections defined by the other element (41), cavities are formed in each surface to define flow passages bridging the projections (37;41), cavities formed in one surface being offset in the axial direction relative to cavities in the other surface, and cavities in one surface overlapping in the axial direction with cavities in the other surface such that material moving between the surfaces from the inlet to the outlet is transferred between the overlapping cavities, wherein the cavities (45, 46, 47, 48, 49, 50; 52, 53, 54, 55, 56, 57, 58) have curved bases, characterized in that the maximum outer diameter of the inner element (51), as measured in mm, is
   greater than 108 plus A, wherein A is the average diameter of the surface area of said cavities times 1.47 and,
   greater than 8.5 plus B, wherein B is the average diameter of the surface area of said cavities times 3.85 and,
   smaller than 468 plus C, wherein C is the average diameter of he surface area of said cavities times −2.92, wherein the diameter, as measured in mm, of the surface area of a cavity, as measured in mm², is defined as the diameter being derived from a circle with equal surface area as said cavity.

4. A mixing apparatus according to claim wherein said axium outer diameter of the inner element (51), as measured in mm greater than 120 plus A, wherein A is the average diameter of the surface area of said cavities times 2 and, greater than 10 plus B, wherein B is the average diameter of the surface area of said cavities times 5 and, smaller than 468 plus C, wherein C is the average diameter ace area of said cavities times −3, and preferably, greater than 30 plus A, wherein A is the average diameter of he surface area of said cavities times 5, and greater than 160, and smaller than 400 plus C, wherein C is the average diameter of the surface area of said cavities times −3, and most preferably, greater than 30 plus A, wherein A is the average diameter of the surface area of said cavities times 5, and greater than 160, and smaller than 400 plus C, wherein C is the average diameter of the surface area of said cavities times −3.

5. A mixing apparatus according to claim 1, wherein at least one annular projection does not have cavities (15) and is an annular projection with an above average diameter, preferably wherein said annular projection has the largest diameter compared to annular projections as defined by the same surface.

6. A mixing apparatus according to claim 1, wherein at least 50%, preferably at least 75%, more preferably at east 90% and most preferably essentially all of said cavities 16,17,18,19, 20,21; 23,24,25,26,27,28; 45, 46, 47, 48, 49, 50; 52, 53, 54, 55, 56, 57, 58) are part spherical.

7. A mixing apparatus according to claim 1, wherein the volume of said cavities (16,17,18,19, 20,21; 23,24,25,26,27, 28; 45, 46, 47, 48, 49, 50; 52, 53, 54, 55, 56, 57, 58) is such that the volume of each cavity is from 0.02 to 10 times, more preferably from 0.05 to 3 times and most preferably from 0,2 to 0.5 times the volume of a sphere having an equal diameter.

8. A mixing apparatus according to claim 1, wherein the number of annular projections (8,12;37,41) as defined by the surface of inner element (1,30) and outer element (5,34) is from 4 to 20 and 4 to 20 respectively, preferably from 5 to 9 and from 5 to 9 respectively and most preferably from 5 to 7 and 5 to 7 respectively.

9. A mixing apparatus according to claim 1, wherein the surfaces of the elements which define the projections are generally conical.

10. A mixing apparatus according to claim 1, wherein each projection (8,12;37,41) is defined between two side surfaces (9,11,13,14;38,40,42,43) each of which is a surface of revolution swept out by a straight line rotated about the axis (10;39).

11. A mixing apparatus according to claim 1, wherein adjacent projections comprise cavities of different shapes.

12. A mixing apparatus according to claim 1, wherein the projections (8;37) defined by one element (5:34) extend into the space between the projections (12;41) defined by the other element (1;30).

13. A mixing apparatus according to claim 1, wherein the average diameter of the cavities (16,17,18,19, 20,21; 23,24, 25,26,27,28; 45, 46, 47, 48, 49, 50; 52, 53, 54, 55, 56, 57, 58) is from 2 to 119, more preferably from 10 to 80 mm, even more preferably from 15 to 65 mm and most preferably from 25 to 55 mm.

14. Method of manufacture of an edible dispersion, preferably a water-in-oil dispersion, comprising the step of mixing an aqueous phase and a fat phase, wherein said fat phase comprises fat powder, in a mixing apparatus, according to claim 1.

15. Method of manufacture of an edible water-in-oil dispersion, according to claim 14, wherein the mixing device is operated at a throughput from 0.1 to 25tons/hour and a rpm from 300 to 7500, preferably from 2 to 15 tons/hour and a rpm from 600 to 4500, and most preferably from 3 to 8 tons/hour and a rpm from 750 to 1500 rpm.

* * * * *